United States Patent
Tibbetts et al.

(10) Patent No.: US 9,932,854 B1
(45) Date of Patent: *Apr. 3, 2018

(54) METHODS OF CLEANING A HOT GAS FLOWPATH COMPONENT OF A TURBINE ENGINE

(71) Applicant: GENERAL ELECTRIC COMPANY, Schenectady, NY (US)

(72) Inventors: Nicole Jessica Tibbetts, Delanson, NY (US); Bernard Patrick Bewlay, Niskayuna, NY (US); Byron Andrew Pritchard, Loveland, OH (US); Brian Michael Ellis, Mayfield, NY (US); Michael Edward Eriksen, Cincinnati, OH (US); Keith Anthony Lauria, Wells, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,613

(22) Filed: Sep. 23, 2016

Related U.S. Application Data

(63) Continuation-in-part of application No. 14/484,897, filed on Sep. 12, 2014.

(Continued)

(51) Int. Cl.
*B08B 7/00* (2006.01)
*F01D 25/00* (2006.01)
(Continued)

(52) U.S. Cl.
CPC .............. *F01D 25/002* (2013.01); *F02C 3/04* (2013.01); *B08B 3/04* (2013.01); *B08B 7/00* (2013.01);
(Continued)

(58) Field of Classification Search
CPC ...... F01D 25/002; F02C 3/04; F05D 2230/72; B08B 3/04; B08B 9/00; B08B 9/02; B08B 9/027
See application file for complete search history.

(56) References Cited

U.S. PATENT DOCUMENTS

| 5,970,574 A | 10/1999 | Thrash, Jr. |
| D422,055 S | 3/2000 | Charles et al. |

(Continued)

FOREIGN PATENT DOCUMENTS

| JP | 2007063998 A | 3/2007 |
| WO | 2015051146 A1 | 4/2015 |

OTHER PUBLICATIONS

Brittain, Cleaning Gas Turbine Compressors: Some Service Experience With a Wet-Wash System, Aircraft Engineering and Aerospace Technology, Jan. 1983, vol. 55, Issue 1, pp. 15-17.

(Continued)

*Primary Examiner* — Sharidan Carrillo
(74) *Attorney, Agent, or Firm* — Nitin N. Joshi

(57) ABSTRACT

The present disclosure provides methods and systems for in situ cleaning of hot gas flowpath components of a turbine engine that form portions of a hot gas flowpath extending through the turbine. The hot gas flowpath components may include a layer of accumulated contaminants on first portions thereof that form a respective portion of the hot gas flowpath. The first portions may include a thermal battier coating (TBC), and the layer of accumulated contaminants may overlie the TBC and at least partially infiltrate into the TBC. The accumulated contaminants may include CaO—MgO—Al2O3-SiO2 (CMAS) partial melt. The methods may include introducing an acid-including detergent into the hot gas flowpath of the turbine engine and onto the hot gas (Continued)

flowpath components to clean the accumulated contaminants from the first surfaces of the components.

22 Claims, 8 Drawing Sheets

Related U.S. Application Data

(60) Provisional application No. 61/913,805, filed on Dec. 9, 2013.

(51) Int. Cl.
*F02C 3/04* (2006.01)
*B08B 9/027* (2006.01)
*B08B 9/00* (2006.01)
*B08B 9/02* (2006.01)
*B08B 3/04* (2006.01)

(52) U.S. Cl.
CPC . *B08B 9/00* (2013.01); *B08B 9/02* (2013.01); *B08B 9/027* (2013.01); *F05D 2230/72* (2013.01)

(56) References Cited

U.S. PATENT DOCUMENTS

| | | |
|---|---|---|
| 6,118,000 A | 9/2000 | Frenier |
| 6,311,704 B1 | 11/2001 | Foster |
| 6,454,871 B1 | 9/2002 | Labib et al. |
| 6,478,033 B1 | 11/2002 | Foster |
| 6,491,048 B1 | 12/2002 | Foster |
| 6,503,334 B2 | 1/2003 | Ruiz et al. |
| 6,916,429 B2 | 7/2005 | Kool et al. |
| 7,198,052 B2 | 4/2007 | Watt |
| 7,531,048 B2 | 5/2009 | Woodcock et al. |
| 8,057,607 B2 | 11/2011 | Gardner et al. |
| 8,246,753 B2 | 8/2012 | Tadayon |
| 8,628,627 B2 | 1/2014 | Sales et al. |
| 8,728,246 B2 | 5/2014 | Varrin, Jr. et al. |
| 8,763,855 B1 | 7/2014 | Harvey et al. |
| 8,871,090 B2 | 10/2014 | Livshits et al. |
| 9,074,830 B2 | 7/2015 | Moll et al. |
| 2002/0103093 A1 | 8/2002 | LaGraff et al. |
| 2003/0015554 A1* | 1/2003 | Gatzke ............... F02B 77/04 222/181.2 |
| 2004/0016445 A1* | 1/2004 | Koch ................. C11D 3/02 134/7 |
| 2006/0137724 A1* | 6/2006 | Powers ............... C11D 3/042 134/41 |
| 2006/0219269 A1 | 10/2006 | Rice et al. |
| 2007/0062562 A1* | 3/2007 | Leaphart ............ F01M 11/00 134/21 |
| 2009/0084411 A1* | 4/2009 | Woodcock ............ B08B 9/00 134/22.18 |
| 2010/0000572 A1 | 1/2010 | Giljohann et al. |
| 2010/0243000 A1* | 9/2010 | Bottcher ............. B08B 9/00 134/22.18 |
| 2011/0088720 A1* | 4/2011 | Varanasi ............. B08B 3/08 134/3 |
| 2014/0034091 A1 | 2/2014 | Dorshimer et al. |
| 2014/0144473 A1 | 5/2014 | Martin |
| 2015/0159122 A1* | 6/2015 | Tibbetts ............. C11D 7/3209 134/22.18 |
| 2015/0159505 A1* | 6/2015 | Scipio ............... B08B 3/08 134/22.19 |
| 2015/0198059 A1* | 7/2015 | Scipio ............... F01D 25/007 134/6 |
| 2015/0285094 A1 | 10/2015 | Tibbetts et al. |
| 2016/0024438 A1* | 1/2016 | Tibbetts ............. C11D 3/2086 134/3 |
| 2016/0032761 A1* | 2/2016 | Griffiths ............ F01D 25/002 244/53 R |
| 2016/0067750 A1 | 3/2016 | Griffiths et al. |
| 2016/0236799 A1* | 8/2016 | Bewlay .............. B08B 9/032 |
| 2017/0130649 A1 | 5/2017 | Bewlay et al. |
| 2017/0165721 A1 | 6/2017 | Tibbetts et al. |
| 2017/0167290 A1 | 6/2017 | Kulkarni et al. |

OTHER PUBLICATIONS

Petasch et al., Low-Pressure Plasma Cleaning; A Process for Precision Cleaning Applications, Dec. 1997, Surface and Coatings Technology, vol. 97, Issues 1-3, pp. 176-181.
"Engine Washing", Aviation Today, pp. 1-3, Sep. 1, 2006.
Eriksen et al., "Turbine Engine Cleaning Systems and Methods", U.S. Appl. No. 15/005,096, filed Jan. 25, 2016.
Kulkarni et al., "Methods and System for Cleaning Gas Trubine Engine", U.S. Appl. No. 15/443,048, filed Feb. 27, 2017.
"On-wing Washing System Using Injected Water or Detergent which Penetrates Deep into the Engine, Cleaning Performance Stealing Contaminants", Aero Jet Wash LLC, pp. 1-2, Aug. 18, 2017.

* cited by examiner

METHODS OF CLEANING A HOT GAS FLOWPATH COMPONENT OF A TURBINE ENGINE

This application is a continuation-in-part of U.S. application Ser. No. 14/484,897, filed Sep. 12, 2014, which claims the benefit of U.S. Provisional Application 61/913,805, filed Dec. 9, 2013, which are herein incorporated by reference.

The field of the present disclosure relates generally to methods of cleaning turbine engines and, more specifically, to methods and systems of cleaning CaO—MgO—Al2O3-SiO2 (CMAS) and other accumulated contaminants from the hot gas flowpath of in situ turbine engines.

Turbine engines used to propel aircraft through certain routes often experience significant fouling due to environmental contaminant or particulate intake during flight, idling, take-off, landing, etc. Turbine engines used in other applications may similarly experience such environmental contaminant matter intake. Environmental contaminants may include, for example, combinations of airborne pollutants (e.g., sulfates, nitrates, etc.), natural evaporite deposits (e.g., halite, carbonates, etc.) and dust (e.g., aluminosilicate clays).

Environmental contaminant fouling or buildup may degrade the performance of a turbine engine. For example, one known mechanism for fouling is the accumulation of such environmental contaminants on both the components of internal cooling circuits and the hot gas flowpath through the engine. The hot gas flowpath through a turbine engine is the geometrical assembly established by a range of complex components in a turbine that interact with combusting and burning fuel and the expansion and exhaust of such gases. In this way, the hot gas flowpath components of a turbine engine may be positioned where fuel is combusted and burned within the turbine to convert the stored energy thereof, and where such gas is expanded and exhausted within the turbine to transform the energy into motion (e.g., rotation) of components of the turbine. Such combustion may take place in a combustion section or combustor of a turbine, and such expansion and exhaust may take place in a turbine section and an exhaust section, respectively, of the turbine. Typical hot gas flowpath components in turbine engines (e.g., aircraft turbine engines and power-generating gas turbines) thereby include stationary vanes or nozzles and rotating blades or buckets of a high pressure turbine (HPT), shrouds surrounding the rotating blades, and combustor liners, domes, deflectors/splashplates and flame-holding segments. The combustor section of a turbine typically includes the combustor liners, domes, and the deflectors/splashplates. Other components of a turbine not specifically listed herein may, however, partially form or interact with the hot gas flowpath through a turbine engine.

The accumulation of environmental contaminants on the components of the internal cooling circuits may block the cooling passages thereof, such as film cooling holes, by forming layers of fouling material therein. The decreased cooling from blocked cooling circuits may contribute to an increase in temperature of the hot gas flowpath surfaces of the turbine that interact with the hot gas flowpath through the turbine. As with the cooling circuits, the contaminants may accumulate on the portions of the hot gas flowpath components that interact with the hot gas flowpath of the turbine.

Surfaces or portions of many hot gas flowpath components that interact with the hot gas flowpath include a ceramic thermal barrier coating (TBC). The thermal barrier coatings (TBCs), which are typically formed of a refractory material, over the component surfaces enhances the performance of the underlying metal (e.g., superalloy) or other material forming the component at high temperatures by reducing the temperature at the surface of the underlying material.

As the operating temperatures of such TBC coated hot gas flowpath components increases, such as due to decreased cooling from the blocked cooling circuits and/or the accumulating contaminants acting as an insulator that decreases the designed heat transfer of the components, the components may exceed the melting point of the accumulation or layer of environmental contaminants. The high temperatures of the contaminated portions of the components interacting with the hot gas flowpath of the turbine, such as the combustor liner or turbine airfoils, can result in thermal alteration and solid-state reactions of the accumulated contaminants.

Often accumulated contaminants of a mixture airborne pollutants (e.g., sulfates, nitrates, etc.), natural evaporite deposits (e.g., halite, carbonates, etc.) and dust (e.g., aluminosilicate clays) on surfaces (TBC coated or non-TBC coated surfaces) of hot gas flowpath components reach operating temperatures that exceeds the melting point of the contaminant accumulation, crossing first the Na—Mg—Ca sulfate eutectic and then the silicate eutectic and transitioning to a CaO—MgO—Al2O3-SiO2 (CMAS) partial melt. If such surfaces include a TBC coating, the CMAS partial melt often infiltrates the TBC coating, thereby decreasing the TBC durability.

As a TBC fails catastrophically through spallation, it initially exposes underlying bond coats and can progress to expose the parent metal (or other material) through oxidization or other deterioration during subsequent use of the turbine. If such a turbine is a high pressure jet engine, such spallation and oxidation can quickly exceed allowable limits for serviceability and lead to unplanned engine removals, decreased time on wing, and increased scrap rate due to unrepairable parent metal distress.

Additionally, surfaces of hot gas flowpath components that interact with the hot gas flowpath and are void of a TBC can also accumulate one or more layers of environmental contaminants thereon. Such surfaces may include an environmental barrier coating (EBC) or may be void of a coating. EBCs are coatings that are resistance to high temperature water vapor environments, such as certain oxide coatings. Environmental contaminants deposited on non-TBC coated surfaces of hot gas flowpath components may reduce the performance of the turbine engine. For example, build-up of contaminants on the turbine nozzle and/or turbine blades of a small turbine engine, such as a turbine powering a helicopter, can at least partially block the hot gas flowpath. Blockage of the hot gas flowpath may reduce turbine flow, thereby resulting in higher turbine operating temperatures, reduced hot-section durability, reduced engine stall margin and, potentially, reduced engine power.

Water wash treatments, which are frequently used to clean turbine components, often are not successful in removing typical accumulated contaminants and its secondary reaction products. At least one known method of removing typical accumulated contaminants includes impinging dry ice particles against the turbine components. However, dry ice is not specifically tailored to dissolve fouling deposits based on the elemental composition of the accumulated contaminants and its reaction products, and instead focuses on mechanical removal of the foulant. Dry ice blasting techniques have thereby been shown to be only partially effective in removing surface CMAS, and ineffective at removing infiltrated CMAS from TBC coated components. Another known method includes treating surfaces of the turbine engine with an acid solution including $H_xAF_6$. Such known acid solutions are generally only tailored to remove low-temperature reaction-based products of typical accumulated contaminants, and are not formulated such that they can be applied in situ (e.g., on-wing) to a fully assembled turbine engine. For example, many acid-based detergents do not meet the AMS1551a or engine manufacturer material compatibility requirements.

Turbine cleaning solutions that remove typical accumulated contaminants that can be applied at the component, sub-assembly or fully assembled turbine engine condition are therefore desirable. Further, turbine cleaning solutions that remove typical accumulated contaminants (surface deposits or infiltrated deposits), such as Na—Mg—Ca sulfate, aluminosilicate clays and CMAS partial melt, from TBC hot gas flowpath components are also desirable.

BRIEF DESCRIPTION

In accordance with an embodiment of the present technique, a method of cleaning a hot gas flowpath component of a turbine engine is provided. The method includes introducing an acid-including detergent with a pH range of between 2 and 7 into a hot gas flowpath of an at least partially assembled turbine engine and onto at least one hot gas flowpath component forming at least a portion of the hot gas flowpath having a layer of accumulated contaminants thereon to clean the accumulated contaminants from the at least one component.

These and other objects, features and advantages of this disclosure will become apparent from the following detailed description of the various aspects of the disclosure taken in conjunction with the accompanying drawings.

DETAILED DESCRIPTION

Figure 1:
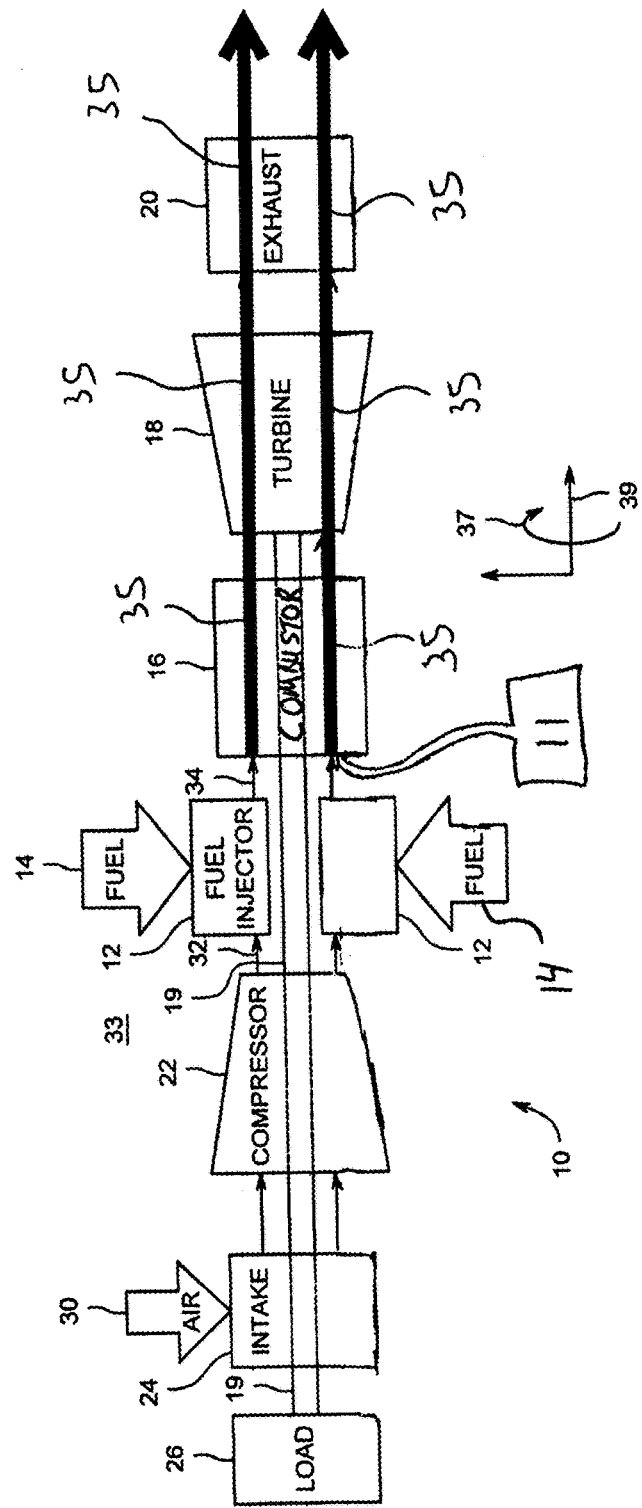
FIG. 1 is a cross-sectional schematic view of an embodiment of a turbine engine system and a cleaning method and system according to the present disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The present disclosure provides methods and systems for cleaning the hot gas flowpath of a gas turbine engine using an acid-including detergent, such as a detergent including citric acid. As explained further below, the hot gas flowpath may be defined or formed by a multitude of components that cooperate to create a passageway of the hot gas flowing through the turbine engine. A gas flowpath component is thereby a component that includes at least a portion that forms the gas flowpath and interacts with the hot gases flowing through the gas flowpath during use of the turbine engine.

The acid-including detergent based methods and systems of cleaning the hot gas flowpath of a gas turbine engine of the present disclosure may be utilized to remove accumulated environmental contaminants or dust, and in particular $CaO$—$MgO$—$Al2O3$-$SiO2$ (CMAS) partial melt, from the gas flowpath components. As explained further below, gas flowpath components that may include such environmental contaminants include combustor components (e.g., liners), stationary components (such as shrouds, nozzles, and vanes), and rotating components (such as blades, or buckets). At least some of the hot gas flowpath components may include a thermal barrier coating (TBC) over the portion of the components that forms the gas flowpath and interacts with the hot gases flowing therethrough. Similarly, at least some of the hot gas flowpath components may include an environmental barrier coating (EBC) over the portions of the components that form the gas flowpath and interact with the hot gases flowing therethrough. Still further, at least some of the hot gas flowpath components may be void of a TBC and/or an EBC over the portions of the components that form the gas flowpath and interact with the hot gases flowing therethrough. The turbine cleaning methods and systems of the present disclosure may be utilized to clean accumulated environmental contaminants from hot gas flowpath components with a TBC, components with an EBC, and components void of a TBC and an EBC (i.e., uncoated components).

For gas flowpath components that do not include a TBC coating (i.e., include an EBC coating or are void of a coating), the accumulation of environmental contaminants thereon may create a surface roughness and/or other anomalies that degrade the aerodynamic performance of the components. Further, accumulated environmental contaminants on hot gas flowpath components (whether coated or uncoated) may at least partially plug cooling holes, such as film cooling holes, that interact with the gas flowpath. The accumulated environmental contaminants may thereby at least partially block the cooling holes and reduce the effectiveness of the cooling holes. The acid-including detergent based turbine cleaning methods and systems of the present disclosure may remove accumulated environmental contaminants from the cooling holes, and thereby at least partially restore of the cooling efficiency of the cooling holes.

For gas flowpath components that include a TBC coating, the acid-including detergent based turbine cleaning methods and systems of the present disclosure may remove environmental contaminants accumulated on the TBC, such as CMAS, to prevent spallation of the TBC. Accumulated environmental contaminants of a mixture of airborne pollutants (e.g., sulfates, nitrates, etc.), natural evaporite deposits (e.g., halite, carbonates, etc.) and dust (e.g., aluminosilicate clays) of gas flowpath components may become heated to such temperatures during turbine operation that the accumulated contaminants fuses and infiltrate the porosity of the TBC. For example, accumulated environmental contaminants on gas flow components may reach operating temperatures that exceeds the melting point of the contaminant accumulation, crossing first the Na—Mg—Ca sulfate eutectic and then the silicate eutectic and transitioning to a CaO—MgO—Al2O3-SiO2 (CMAS) partial melt. The CMAS partial melt may flow or otherwise infiltrates into the porosity of the TBC. The porosity of the TBC is critical as it may provide compliance to accommodate the thermal strain mismatch between the TBC and the underlying component material beneath the TBC (e.g., typically a metal). The acid-including detergent based turbine cleaning methods and systems of the present disclosure may remove the contaminant accumulation on gas flowpath components prior to, or after, fusion and infiltration into the TBC. In this way, the acid-including detergent based turbine cleaning methods and systems of the present disclosure may serve to at least partially restore compliance of TBCs of gas flowpath turbine components. Additionally, for hot gas flowpath components with or without a TBC coating (e.g., include a TBC coating and/or an EBC coating or are uncoated), the turbine cleaning methods and systems of the present disclosure may restore the natural or intended aerodynamic shape and surface roughness of the components. Removal of contaminant accumulation from hot gas flowpath components (e.g., components that include a TBC coating and/or an EBC coating or are uncoated) via the turbine cleaning methods and systems of the present disclosure may thereby extend engine life, extend part life, reduced part scrap during maintenance of the engine, reduce operating hot-section temperatures, increase core flow, increase engine power, and/or increased compressor stall margin.

Turning now to the drawings, FIG. 1 is a block diagram of a turbine engine system 10 illustrating an acid-including detergent based turbine hot gas flowpath cleaning method and system 11 configured to clean accumulated environmental contaminants from gas flowpath components of the turbine engine 10. Turbine engine 10 may be any type of gas or combustion turbine aircraft engine including but not limited to turbofan, turbojet, turboprop, turboshaft engines as well as geared turbine engines such as geared turbofans, un-ducted fans and open rotor configurations. Alternatively, turbine engine 10 may be any type of gas or combustion turbine engine, including but not limited to land-based gas turbine engine in simple cycle, combined cycle, cogeneration, marine and industrial applications.

As shown in FIG. 1, the turbine system 10 may include a fuel injector 12, a fuel supply 14, a combustor 16, and a high pressure turbine 18. As illustrated in FIG. 1, the fuel supply 14 may route a liquid fuel and/or gas fuel to the gas turbine system 10 through the fuel injector 12 and into the combustor 16. As discussed below, the fuel injector 12 may be configured to inject and mix the fuel with compressed air. The combustor 16 may ignite and combust the fuel-air mixture, and then pass hot pressurized exhaust gas into the turbine 18. As will be appreciated, the turbine 18 may include one or more stators having fixed vanes or blades, and one or more rotors having blades which rotate relative to the stators. The hot pressurized exhaust gas may pass through the turbine rotor blades, thereby driving the turbine rotor to rotate. Coupling between the turbine rotor and a shaft 19 may cause the rotation of the shaft 19, which is also coupled to several components throughout the gas turbine system 10, as illustrated. Eventually, the exhaust of the combustion process may exit the gas turbine system 10 via an exhaust outlet 20. In some embodiments, the gas turbine system 10 may be a gas turbine system of an aircraft, in which the exhaust outlet 20 may be a nozzle through which the exhaust gases are accelerated. Acceleration of the exhaust gases through the exhaust outlet 20 (e.g., the nozzle) may provide thrust to the aircraft. As described below, the shaft 19 (e.g., in an aircraft gas turbine system 10) may be coupled to a propeller, which may provide thrust to the aircraft in addition to, or in place of, the exhaust gases accelerated through the exhaust outlet 20 (e.g., the nozzle).

The compressor 22 of the turbine system 10, as shown in FIG. 1, may include blades rigidly mounted to a rotor which is driven to rotate by the shaft 19. As air passes through the rotating blades, air pressure may increase, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane as previously described, and so forth. The air intake 24 may draw air 30 into the gas turbine system 10 via a suitable mechanism, such as a cold air intake. The air 30 may then flow through blades of the compressor 22, which may provide compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As noted above, the combustor 16 may ignite and combust a fuel-air mixture, and then pass hot pressurized exhaust gas into the turbine 18. Components of the combustor 16 may thereby from a portion of the hot gas flowpath 35, and therefore may be gas flowpath components. For example, at least a portion of combustor liners, domes, deflectors or splashplates and/or flame-holding segments of the combustor 16 may form or otherwise interact with the hot gas flowpath 35, and therefore may be gas flowpath components. The portions of the gas flowpath components of the combustor 16 that interact with the hot gas flowpath 35 may include a TBC and/or a plurality of cooling holes. As also discussed above, the hot pressurized exhaust gas may pass from the combustor 16 to and through the turbine 18. As such, components of the turbine 18 may thereby also form a portion of the hot gas flowpath 35, and therefore may be gas flowpath components. For example, at least a portion of stationary vanes or nozzles, rotating blades or buckets, and/or stationary shrouds surrounding the rotating blades of the turbine 18 may form or otherwise interact with the hot gas flowpath 35, and therefore may be gas flowpath components.

The portions of the gas flowpath components of the turbine 18 that interact with the hot gas flowpath 35 may include a TBC and/or a plurality of cooling holes. Further, the exhaust of the combustion process may flow from the turbine 18 to and through the exhaust outlet 20 to exit the gas turbine system 10. Components of the exhaust outlet 20 may thereby also form a portion of the hot gas flowpath 35, and therefore may be gas flowpath components. For example, at least a portion of nozzle boxes and/or nozzle plates of the exhaust outlet 20 may form or otherwise interact with the hot gas flowpath 35, and therefore may be gas flowpath components. The portions of the gas flowpath components of the exhaust outlet 20 that interact with the hot gas flowpath 35 may include a TBC and/or a plurality of cooling holes. Other components of the combustor 16, turbine 18, and exhaust outlet 20 may interact with the hot gas flowpath 35, and therefore may be gas flowpath components, such as seal components, valve stems, etc., and may or may not include a TBC and/or a plurality of cooling holes.

As explained above, the turbine system 10 may be susceptible to accumulation of environmental contaminants, namely dust, within components of the turbine system 10. For example, at least the hot gas flowpath components of the combustor 16, turbine 18, and exhaust outlet 20 of the turbine system 10 may accumulate environmental contaminants thereon during use of the turbine system 10. Such accumulated environmental contaminants may be a mixture of airborne pollutants (e.g., sulfates, nitrates, etc.), natural evaporite deposits (e.g., halite, carbonates, etc.) and dust (e.g., aluminosilicate clays). The accumulated environmental contaminants of gas flowpath components may become heated to such temperatures during turbine operation that the accumulated contaminants fuses and infiltrates the porosity of the TBC, if provided thereon, and/or at least partially plugs cooling holes thereof. For example, accumulated environmental contaminants on gas flow components of the combustor 16, turbine 18, and exhaust outlet 20 may reach operating temperatures that exceeds the melting point of the contaminant accumulation, crossing first the Na—Mg—Ca sulfate eutectic and then the silicate eutectic and transitioning to a CaO—MgO—Al2O3-SiO2 (CMAS) partial melt. The CMAS partial melt may flow or otherwise infiltrates into the porosity of the TBC provided thereon and/or into or over cooling holes thereof. The loss of porosity of the TBC via the CMAS may prevent the TBC from accommodating the thermal strain mismatch between the TBC and the underlying component material beneath the TBC (e.g., a metal). The TBC may spall from the thermal strain mismatch and thereby expose the underlying component material to the harsh conditions within the hot gas flowpath 35, which may oxidize metal components for example.

Accordingly, as illustrated in FIG. 1, acid-including detergent based turbine cleaning methods and systems 11 of the present disclosure may be utilized to clean the accumulated environmental contaminants from the hot gas flowpath components of the combustor 16, turbine 18, and exhaust outlet 20 of the turbine system 10, such as from TBCs thereof and/or cooling holes thereof. As shown in FIG. 1, the cleaning methods and systems 11 may include introducing a flow of an acid-including detergent into the hot gas flowpath 35 and onto the portions of the hot gas flowpath components forming the hot gas flowpath 35 having a layer of accumulated contaminants thereon to clean the accumulated contaminants from the components. As the hot gas flowpath components of the turbine system 10 may be located or positioned within the combustor 16, the turbine 18 and the exhaust outlet 20, the flow of detergent may be introduced (i.e., fluidly coupled) at upstream of at least a portion of the combustor 16, as shown in FIG. 1. However, as the of the components turbine system 10 are integral or coupled together such that a passageway extends through inner portions of all the components, at least a portion of the detergent may be introduced upstream of the combustor 16 such that the detergent ultimately flows into the gas flowpath 35 (i.e., the detergent flows in the direction that gases/fuel pass through the turbine system 10). For example, the detergent may be introduced (e.g., fluidly coupled) into the air intake(s) 24, the compressor 22, the fuel injector(s) 12, the combustor(s) 16, the turbine 18, and/or the exhaust outlet 20. In some embodiments, the detergent flow may be physically coupled to only one component or one group of components of the gas turbine system 10, such as to the air intake or intakes 24, or to the compressor 22. For example, although the components of the turbine system 10 are shown separate from one another in the illustrated embodiment, the components may be integral with each other or coupled together such that a fluid passageway extends through inner portions of all the components to the gas flowpath 35. Such a fluid passageway may be substantially continuous through the components and/or may be at least partially sealed from an environment 33 outside the gas turbine system 10. The acid-including detergent based turbine cleaning methods and systems 11 may introduce and/or pass the detergent through at least a portion of the hot gas flowpath 35 of the turbine system 10 in the direction that hot gases pass through the hot gas flowpath 35 during operation of the turbine system 10. In another embodiment, however, the acid-including detergent based turbine cleaning methods and systems 11 may introduce and/or pass the detergent through at least a portion of the hot gas flowpath 35 of the turbine system 10 in a direction opposing the direction that hot gases pass through the hot gas flowpath 35 during operation of the turbine system 10.

Although the gas flowpath 35 is shown on only bottom and top portions of the illustrated gas turbine system 10, the gas flowpath 35 may be an annular passageway extending in an annular direction 37 about a longitudinal direction 39 (or axis) of the gas turbine system 10. The flow of detergent may be coupled to one of the components (e.g., a first of the components, such as the air intake[s] 24 or the compressor 22) at an inlet 36, such that the detergent is fluidly coupled to the fluid passageway at the inlet 36. It should be noted that, in some embodiments, the cleaning methods and systems 11 may include a delivery system or manifold that is coupled to a number of inlets to the gas turbine system 10 (e.g., an engine inlet). For example, a delivery system or manifold of the cleaning system and method 11 may introduce the flow of detergent, as described below, into the hot gas flowpath via at least one existing port or inlet of the turbine engine that is communication with the hot gas flowpath, such as through at least one port used for borescope injection, as a fuel injection nozzle, for igniter plugs, or any other pre-existing inlet port in communication with the hot gas flowpath. As another example, the system and method 11 may include forming at least one new inlet or port in the turbine engine in communication with the hot gas flowpath, and introducing the flow of detergent into the hot gas flowpath via the at least one new port or inlet.

Introducing the flow of acid-including detergent into the gas flowpath 35 via the at least one port (pre-existing or newly formed) may cause the detergent to flow compressor blades, compressor vanes, through the compressor 16, through and/or outside of the turbine 18, through the exhaust 20, through cooling circuits or cooling holes of at least the compressor 16, turbine 18, and/or exhaust 20, or combination thereof. The detergent may be introduced generally into the gas flowpath 35 such that the detergent flows freely through the gas flowpath 35 as defined by the gas flow components to clean accumulated environmental contaminants therefrom. In this way, the detergent may flow naturally through the gas flowpath 35 along substantially similar paths as the hot gases flow therethrough during use of the turbine. In other embodiments, the detergent may be introduced into the gas flowpath 35 such that the detergent is specifically directed on one or more preselected hot gas flow components or portions thereof to selectively clean accumulated environmental contaminants therefrom. In some such embodiments, the detergent may be directed to the one or more preselected hot gas flow components or portions thereof as a high velocity jet or stream. In some embodiments, the detergent may be introduced into the gas flowpath 35 both generally into the flowpath 35 and specifically directed on one or more preselected hot gas flow components or portions thereof.

The cleaning methods and systems 11, as shown in FIG. 1, may be configured to generate, and provide to the hot gas flowpath 35 of the gas turbine system 10, an acid-including detergent that dissolves, or loosens, soaks, and/or absorbs, the environmental contaminants accumulated on the portions of the gas flowpath components forming the hot gas flowpath 35 to clean the accumulated environmental contaminants therefrom. The cleaning methods and systems 11 may also include components or processes configured to rinse the gas turbine system 10 after the detergent soaks the gas flowpath components of the gas turbine system 10 for a defined period of time. For example, cleaning methods and systems 11 may be configured to introduce the detergent into the hot gas flowpath 35 and onto the hot gas flowpath components at a temperature within 20 degrees C. to about 95 degrees C. for at least 15 minutes. In some embodiments, the detergent may remain within the hot gas flowpath 35 and on the hot gas flowpath components for up to about 8 hours.

Components or processes of the cleaning methods and systems 11 may be configured to generate an acid-including detergent having particular characteristics that enable desired cleaning effects of the accumulated environmental contaminants of the hot gas flowpath components of the turbine 18. For example, the cleaning methods and systems 11 may generate and provide to the gas turbine system 10 an acid-including foamed liquid detergent (e.g., having a desired half-life, a desired bubble size, or both) effective in causing the foamed detergent to soak the accumulated environmental contaminants on the hot gas flowpath components of the turbine system 10 for a desired period of time and with a desired effectiveness, as described below. As another example, the cleaning methods and systems 11 may generate and provide to the gas turbine system 10 an acid-including liquid detergent effective in causing the detergent to soak the accumulated environmental contaminants on the hot gas flowpath components of the turbine system 10 for a desired period of time and with a desired effectiveness. As still yet another example, the cleaning methods and systems 11 may generate and provide to the gas turbine system 10 an acid-including atomized detergent effective in causing the detergent to soak the accumulated environmental contaminants on the hot gas flowpath components of the turbine system 10 for a desired period of time and with a desired effectiveness.

As discussed above, the detergent utilized to clean (e.g., dissolve) accumulated environmental contaminants on hot gas flowpath components of the turbine system 10 may, for example, include at least one acid. In some embodiments the acid-including detergent may has a have pH value in the range between 2.5 and 7.0. In some embodiments, the acid-including detergent may include citric acid. In other embodiments, the acid-including detergent may include at least one acid other than citric acid (in addition to, or in place of, citric acid).

In some citric acid-including embodiments, the detergent may include a first organic acidic component including citric acid within a range between about 0.1 percent and about 15 percent by volume of the detergent. In some such embodiments, the detergent may include a second organic acidic component including glycolic acid within a range between about 0.1 percent and about 15 percent by volume of the detergent. In some embodiments, the detergent may include isoropylamine sulphonate within a range between about 0.07 percent and 0.14 percent by volume of the detergent. In some embodiments, the detergent may include alcohol ethoxylate within a range between about 0.035 percent and 0.07 percent by volume of the detergent. In some embodiments, the detergent may include triethanol amine within a range between about 0.035 percent and 0.07 percent by volume of the detergent. In some embodiments, the detergent may include sodium lauriminodipropionate within a range between about 0.03 percent and 1.0 percent by volume of the detergent. In some embodiments, the detergent may include water within a range between about 68.65 percent and about 99.63 percent by volume of the detergent. In some embodiments, the detergent includes at least one of less than about 100 parts per million of sulfur, less than about 10 parts per million of sodium, less than about 20 parts per million of chlorine, less than about 10 parts per million of potassium, less than about 10 parts per million of phosphorous, less than about 2 parts per million of metals, or combinations thereof. Other suitable acid-including detergents may be used in accordance with present embodiments however, as the above described embodiments are only exemplary potential acid—including detergents.

The acid-including detergent described above may be used to target (e.g., preferentially dissolve) types of accumulated environmental contaminants that accumulate on hot gas flowpath components of the turbine system 10, but without stripping away materials of the components of the turbine system 10. For example, the accumulated environmental contaminants may include a mineral dust, or naturally occurring granular material that includes particles of various rocks and minerals. For example, the accumulated environmental contaminants may include mineral dust capable of becoming airborne at sub-38 microns in size, and accumulate in the turbine engine 10 during taxi, take-off, climb, cruise, landing, as well as when the turbine engine 10 is not in operation or utilized on land configurations. The elemental composition and phases within the accumulated environmental contaminants may vary based on a location of the accumulated environmental contaminants within sections of the turbine engine 10 and/or the operational environment (e.g., including geographical location of use) of the turbine engine 10. For example, increased temperatures in the high pressure turbine 18 section caused by combustion result in increased temperatures on surfaces of the components therein. As such, the accumulated environmental contaminants on the gas flowpath components in the high pressure turbine 18 may be more likely to thermally react to form CMAS-based reaction products (e.g., $[(Ca,Na)_2(Al,Mg,Fe^{2+})(Al,Si)SiO_7]$), and subsequent layers of accumulate on the surface of the reaction products. In some embodiments, the accumulated environmental contaminants may include sulfate, aluminosilicate clay and CMAS. In some embodiments, the accumulated environmental contaminants may include airborne pollutants (e.g., sulfates, nitrates, etc.), natural evaporite deposits (e.g., halite, carbonates, etc.), dust (e.g., aluminosilicate clays) or combinations thereof. In some embodiments, the accumulated environmental contaminants may include Na—Mg—Ca sulfate partial melt, an aluminosilicate clay, CMAS partial melt or combinations thereof. In some embodiments, the accumulated environmental contaminants may include sulfate and silicate partial melt.

The cleaning methods and systems 11 described herein generates the acid-including detergent that facilitates removing the accumulated environmental contaminants described above (and similar contaminants). For example, the cleaning methods and systems 11 may target (e.g., selectively dissolve) oxide-based, chloride-based, sulfate-based, and carbon-based constituents of the CMAS-based reaction products, interstitial cement, and the subsequent layers of accumulated mineral dust from the turbine components. More specifically, the acid-including detergent may selectively dissolve constituents of the environmental contaminants accumulated on the hot gas flowpath components, which may include a TBC coating, that form the hot gas flowpath 35 of the turbine engine 10. As used herein, "selectively dissolve" refers to an ability to be reactive with predetermined materials, and to be substantially unreactive with materials other than the predetermined materials. As such, the methods described herein facilitate removing reacted and unreacted environmental contaminants from the hot gas flowpath components while being substantially unreactive with the material used to form the hot gas flowpath components to limit damage thereto. In some embodiments, the material used to form the hot gas flowpath components may be a metallic material such as, but not limited to, nickel, titanium, aluminum, vanadium, chromium, iron, cobalt or combinations thereof. Dissolving constituents of the environmental contaminants accumulated on the hot gas flowpath components may at least reduce the risk of the contaminants redepositing on downstream portions of the engine, plugging cooling holes or other passageways, and/or otherwise causing harm to the engine.

The cleaning methods and systems 11 may be performed on the turbine engine system 10 in at least a partially assembled state of the turbine engine system 10. For example, the turbine system 10 may only be partially disassembled so as to provide access to the hot gas flowpath 35 during cleaning via the cleaning methods and systems 11. In some embodiments, the engine system 10 may be fully assembled when subjected to the cleaning methods and systems 11. If the turbine engine system 10 is an aircraft engine, the engine system 10 may be at least partially assembled and attached to the aircraft when subjected to the cleaning methods and systems 11. In such embodiments, the acid-including detergent may formulated to be at least compliant with on-wing requirements, such as AMS1551a, engine manufacturer compatibility testing, etc. For example, the cleaning methods and systems 11 may apply the acid-including detergent in a form, temperature and duration to the hot gas flowpath 35 (e.g., via at least one preexisting port or newly formed port) on an assembled and installed aircraft engine (e.g., on-wing) such that the detergent preferentially dissolves Na—Mg—Ca sulfate, aluminosilicate clays and CaO—MgO—Al2O3-SiO2 (CMAS) partial melt from TBC coated gas flowpath components, but does not present enough detergent into the turbine system 10 to prevent it from being restarted. In some embodiments, the cleaning methods and systems 11 may be performed on the turbine engine system 10 at piece-part, sub-assembly or assembled engine level.

Figure 2:
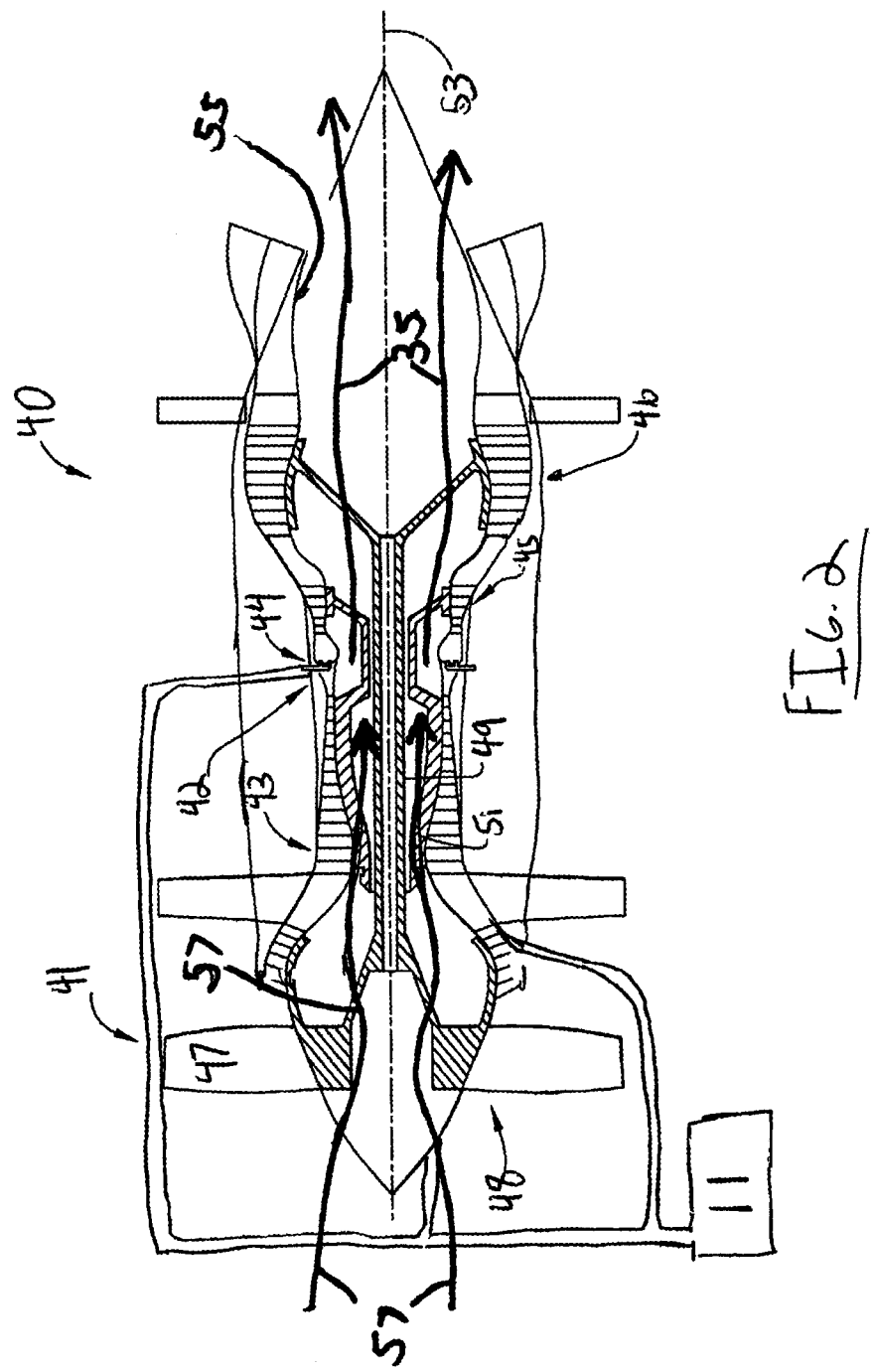
FIG. 2 is a cross-sectional schematic view of an embodiment of a turbine engine system and a cleaning method and system according to the present disclosure.

FIG. 2 illustrates a cross-sectional schematic view of an embodiment of the cleaning methods and systems 11 and an aircraft gas turbine engine 40 (e.g., aeroderivative gas turbine engine) that includes a fan assembly 41 and a core engine 42 including a high pressure compressor 43, a combustor 44, a high-pressure turbine (HPT) 45, and a low-pressure turbine (LPT) 46. The illustrated aircraft gas turbine engine 40 may be an example of the turbine engine 10 illustrated in FIG. 1. In the illustrated embodiment, the fan assembly 41 of the turbine engine 40 (e.g., an aircraft gas turbine engine) includes an array of fan blades 47 that extend radially outward from a rotor disk 48. The gas turbine engine 40 has an intake side (e.g., proximate the fan assembly 41) and an exhaust side (e.g., proximate the LPT 46). The fan assembly 41 and the LPT 46 are coupled by a low-speed rotor shaft 49, and the high pressure compressor 43 and the HPT 45 are coupled by a high-speed rotor shaft 51. The gas turbine engine 40 may be any type of gas or combustion turbine aircraft engine including, but not limited to, turbofan, turbojet, turboprop, turboshaft engines as well as geared turbine engines such as geared turbofans, un-ducted fans and open rotor configurations. Alternatively, the gas turbine engine 40 may be any time of gas or combustion turbine engine, including, but not limited to, land-based gas turbine engines in simply cycle, combined cycle, cogeneration, marine and industrial applications.

Generally, in operation, air flows axially through the fan assembly 41, in a direction that is substantially parallel to a centerline 53 that extends through the gas turbine engine 40, and compressed air is supplied to the high pressure compressor 43. The highly compressed air is delivered to the combustor 44. Combustion gas flows along the hot gas flowpath 35 from the combustor 44 and drives the turbines 45 and 46. The hot gas flow flows to the HPT 45 and the LPT 46 to rotate the HPT 45, which in turn drives the compressor 43 by way of the shaft 51, and the LPT 46 drives the fan assembly 41 by way of the shaft 49. The hot gas flow flows from the PT 45 and the LPT 46 through the exhaust 55. Components of the combustor 44, HPT 45, the LPT 46 and exhaust 55 may thereby from a portion of the hot gas flowpath 35. As discussed above, environmental contaminants (e.g., Na—Mg—Ca sulfate, aluminosilicate clays and CMAS) may accumulate on the hot gas flowpath components of the combustor 44, HPT 45, the LPT 46 and exhaust 55, and such components may include a TBC.

As shown, the cleaning methods and systems 11 may supply the cleaning acid-including detergent (e.g., a citric acid-including detergent) to any number of inlets to the hot gas flowpath 35 of the gas turbine engine 40. For example, as shown in FIG. 2 the methods and systems 11 may supply the cleaning detergent directly to the hot gas flowpath 35 extending through the combustor 44, HPT 45, the LPT 46 and exhaust 55. As also shown in FIG. 2, the methods and systems 11 may supply the cleaning detergent to a fluid passageway 57 extending upstream of the hot gas flowpath 35 (e.g., within the compressor 43) that extends to the hot gas flowpath 35 in the combustor 44.

Figure 3:
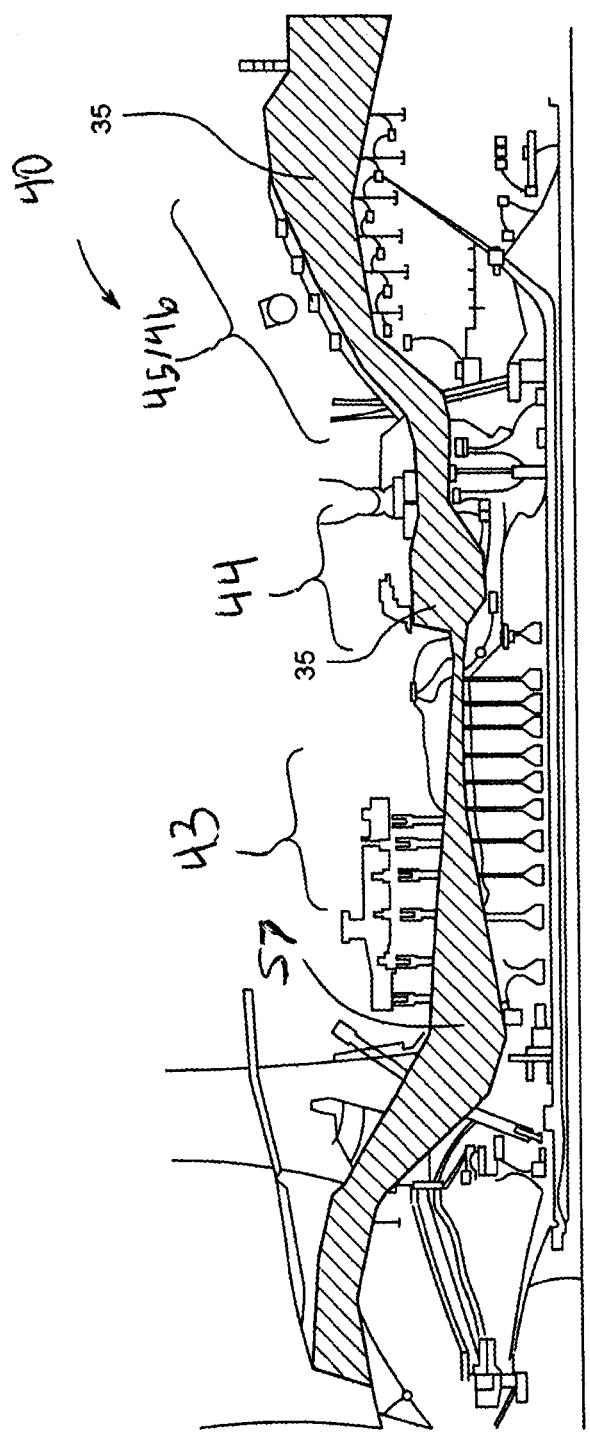
FIG. 3 is an enlarged cross-sectional schematic view of a portion of the turbine engine system and the cleaning method and system of FIG. 2.

An example of an embodiment of the fluid passageway 57 and hot gas flowpath 35 extending continuously through various components of the gas turbine engine 40 of FIG. 2 (e.g., through at least the compressor 43, the combustor 44, the HPT 45, and the LPT 46) is shown in FIG. 3. As shown in FIG. 3, the cleaning methods and systems 11 may inject or enable flow of the detergent into the fluid passageway 57 and directly into the hot gas flowpath 35 of the gas turbine engine 40. The inlet(s) to the fluid passageway 57 and the inlet(s) to the hot gas flowpath 35 may include inlets utilized for other purposes or inlets dedicate for hot gas flowpath cleaning. It should also be noted that the cleaning methods and systems 11 may be utilized for cleaning the fluid passageway 57 and/or the hot gas flowpath 35 of any gas turbine engine 40 (e.g., including the turbine system 10 of FIG. 1) in accordance with presently described embodiments.

As previously described, the detergent utilized to clean (e.g., dissolve) accumulated environmental contaminants on hot gas flowpath components (e.g. on TBCs thereof) of the turbine system 40 may include at least one acid. In some embodiments the acid-including detergent may has a have pH value in the range between 2.5 and 7.0. In some embodiments, the acid-including detergent may include citric acid. In other embodiments, the acid-including detergent may include at least one acid other than citric acid (in addition to, or in place of, citric acid).

In some citric acid-including embodiments, the detergent may include a first organic acidic component including citric acid within a range between about 0.1 percent and about 15 percent by volume of the detergent. In some such embodiments, the detergent may include a second organic acidic component including glycolic acid within a range between about 0.1 percent and about 15 percent by volume of the detergent. In some embodiments, the detergent may include isoropylamine sulphonate within a range between about 0.07 percent and 0.14 percent by volume of the detergent. In some embodiments, the detergent may include alcohol ethoxylate within a range between about 0.035 percent and 0.07 percent by volume of the detergent. In some embodiments, the detergent may include triethanol amine within a range between about 0.035 percent and 0.07 percent by volume of the detergent. In some embodiments, the detergent may include sodium lauriminodipropionate within a range between about 0.03 percent and 1.0 percent by volume of the detergent. In some embodiments, the detergent may include water within a range between about 68.65 percent and about 99.63 percent by volume of the detergent. In some embodiments, the detergent includes at least one of less than about 100 parts per million of sulfur, less than about 10 parts per million of sodium, less than about 20 parts per million of chlorine, less than about 10 parts per million of potassium, less than about 10 parts per million of phosphorous, less than about 2 parts per million of metals, or combinations thereof. Other suitable acid-including detergents may be used in accordance with present embodiments however, as the above described embodiments are only exemplary potential acid—including detergents.

Figure 4:
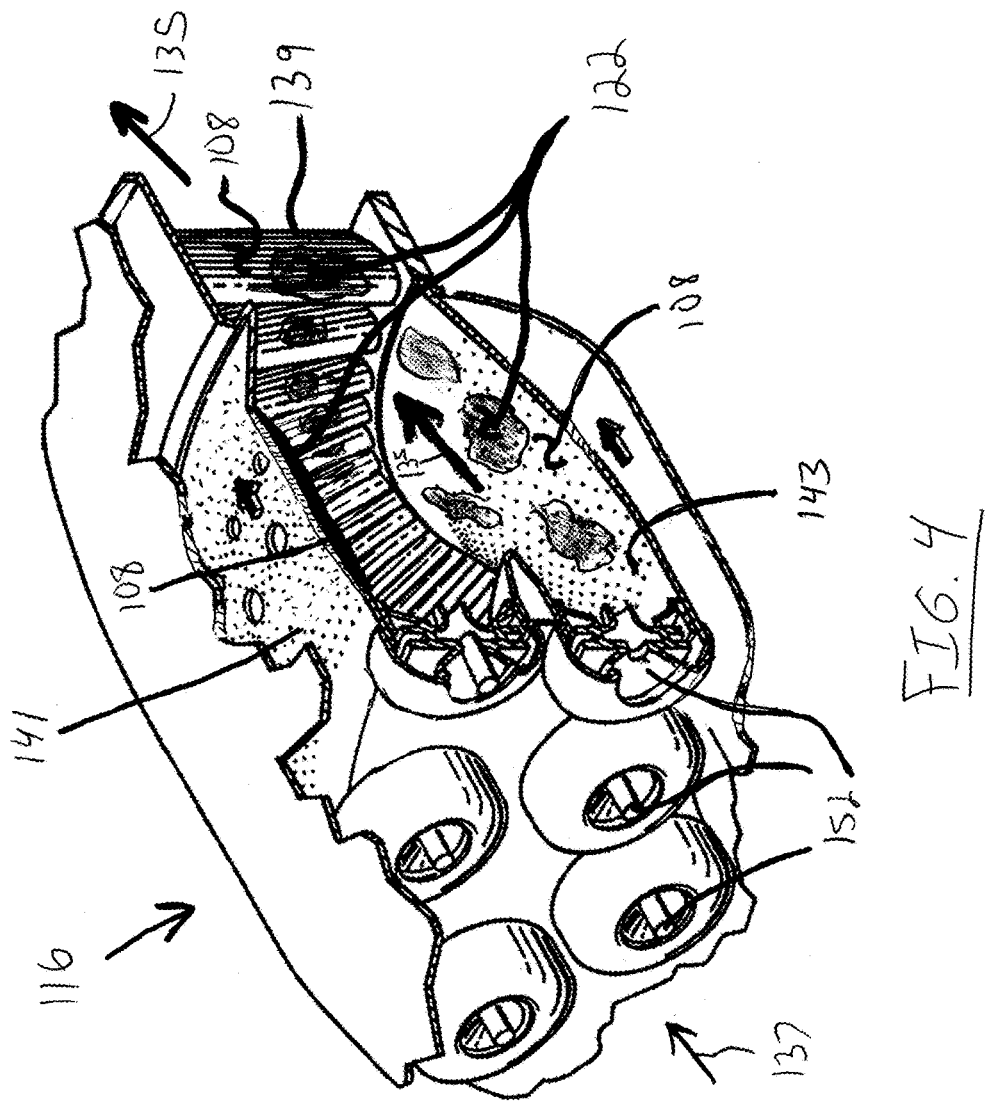
FIG. 4 is a cross-sectional schematic view of a combustion section of a turbine engine including gas path components with accumulated contaminants thereon according to the present disclosure.

Referring now to FIG. 4, a perspective view of a combustion section 116 of a turbine engine (e.g., the turbine engine system 10 or 40 described above) positioned in a compressor discharge flow 137 in energized fluid supply communication with a turbine section denoted by turbine blades 139. The combustion section 116 is further comprised of axially and circumferentially extending outer and inner combustor liners 141 and 143, respectively, radially spaced from each other to define a portion of the hot gas flowpath 135 (and combustion zone) therebetween, as shown in FIG. 4. Disposed at the upstream end of the combustor liners 141 and 143 is a plurality of fuel injectors 152 mounted within a plurality of apertures in a combustor dome of the combustor section 116. As noted above, in one embodiment the apertures for the fuel injectors 152 may be utilized for the introduction of the acid-including detergent into the hot gas flowpath 135 (however, as also noted above, other avenues for introducing the detergent into the hot gas flowpath 135 may alternatively be utilized).

Portions of the combustion section 116 of a turbine engine may develop environmental contaminants 122 accumulated on a portion or surface 108 that forms or interacts with the hot gas flowpath 135 of the turbine engine. For example, as shown in FIG. 4 surfaces 108 of the combustor liners 141 and 143 and blades 139 that form or interact with the hot gas flowpath 135 of the combustion section 116 of the turbine engine may include environmental contaminants 122 accumulated thereon. While FIG. 4 depicts a combustion section 116 of a turbine engine, hot gas path components with accumulated environmental contaminants 122 are not limited to the combustion section 116 of a turbine engine and may be present in the turbine and/or exhaust sections of the turbine, for example and as discussed above. For example, exemplary turbine components that may accumulate environmental contaminants may include, but are not limited to, liners, shrouds, buckets, blades, nozzles, vanes, seal components, valve stems, nozzle boxes, and nozzle plates.

Figure 5:
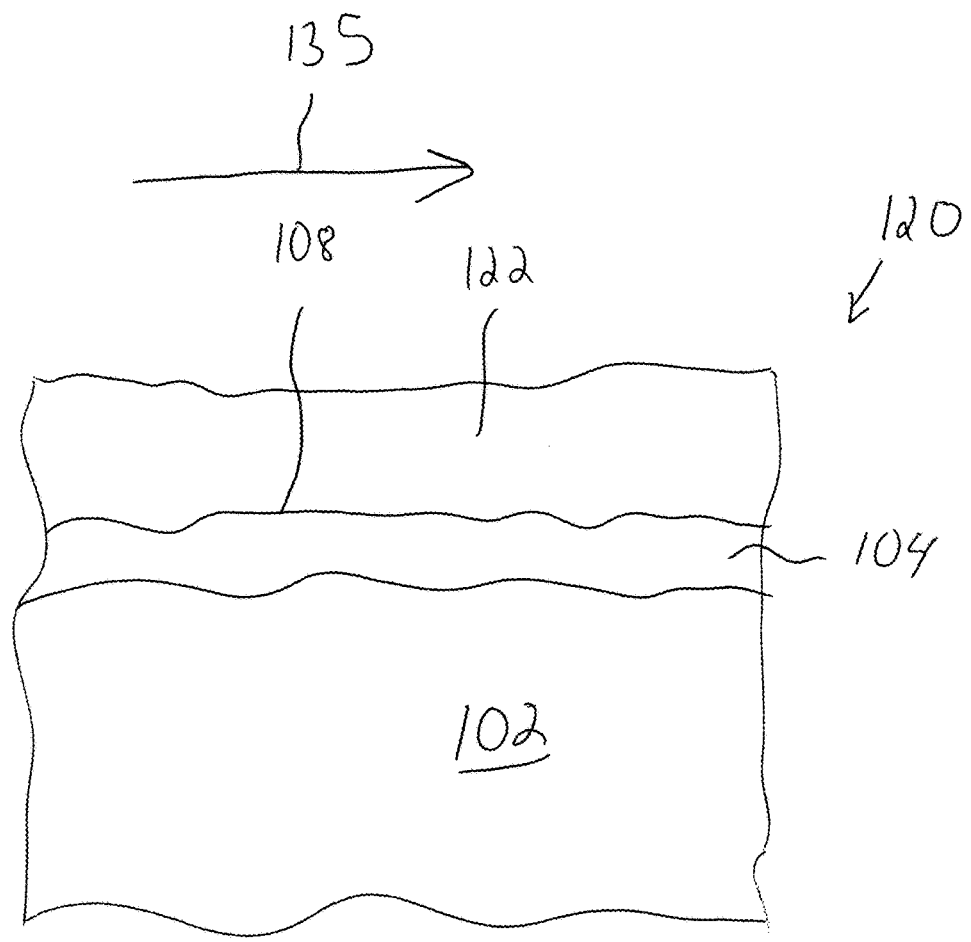
FIG. 5 is a cross-sectional schematic view of a portion of a gas path component of FIG. 4.

FIG. 5 depicts a cross-section of an exemplary hot gas flowpath component 120 that includes accumulated environmental contaminants 122, such as the combustor liners 141 and 143 and blades 139 of the combustion section 116 of FIG. 4. FIG. 5 may equally represent an embodiment of another hot gas flowpath component 120 of the combustion section 116 with accumulated environmental contaminants 122, or a hot gas flowpath component 120 of a turbine section or exhaust section of a turbine with accumulated environmental contaminants 122. As shown in FIG. 5, the component 120 may include a substrate 102 and a coating 104 (e.g. a TBC and/or EBC) on the substrate 102. The coating 104 may be formed of one or more layers that overlie the substrate 102. The coating 104 may include at least one layer of a non-metallic material including but not limited to rare earth element ceramic oxides (e.g., as a TBC) and/or at least one layer of a material that is resistance to high temperature water vapor environments, such as certain oxide coatings (e.g., as an EBC). The substrate 102 may fabricated from any material, such as a metallic material. As used herein, the term "metallic" may refer to a single metal or a metal alloy. Exemplary metallic materials include, but are not limited to, nickel, titanium, aluminum, vanadium, chromium, iron, and cobalt. Alternatively, substrate 102 may be fabricated from a non-metallic material, including but not limited to ceramic matrix composites (CMCs), polymer matrix composites (PMCs) as well as other non-metallic materials.

The accumulated environmental contaminants 122 on the hot gas path component 102 may be formed of one or more layers of environmental contaminants 122 that may have accumulated over a period of time and/or operation of the turbine. The accumulated environmental contaminants 122 may directly overlie the coating 104 as shown in FIG. 5, or may directly overlie the substrate 102 if a coating 104 is not provided. As noted above, in some embodiments the coating 104 may be a TBC and/or EBC.

Combustion gases formed in the combustor section 116 of a turbine engine may be channeled downstream within the hot gas flowpath 135 and interact with the component 120. Such increased temperature of the component 120 via the hot gases flowing through the hot gas flowpath 135 may facilitate initiating thermal reactions in the accumulated environmental contaminants 122. The thermal alteration of the accumulated environmental contaminants 122 may facilitate forming a glassy amorphous phase and a change of the elemental composition of the accumulated environmental contaminants 122. For example, as described above, the accumulated environmental contaminants 122 may include a mixture airborne pollutants (e.g., sulfates, nitrates, etc.), natural evaporite deposits (e.g., halite, carbonates, etc.) and dust (e.g., aluminosilicate clays), and the hot gas flowpath 135 may elevate the operating temperatures of the component 120 such that the temperature of the accumulated environmental contaminants 122 exceeded its melting point, crossing first the Na—Mg—Ca sulfate eutectic and then the silicate eutectic, and transitioning to CMAS partial melt 122.

Figure 6:
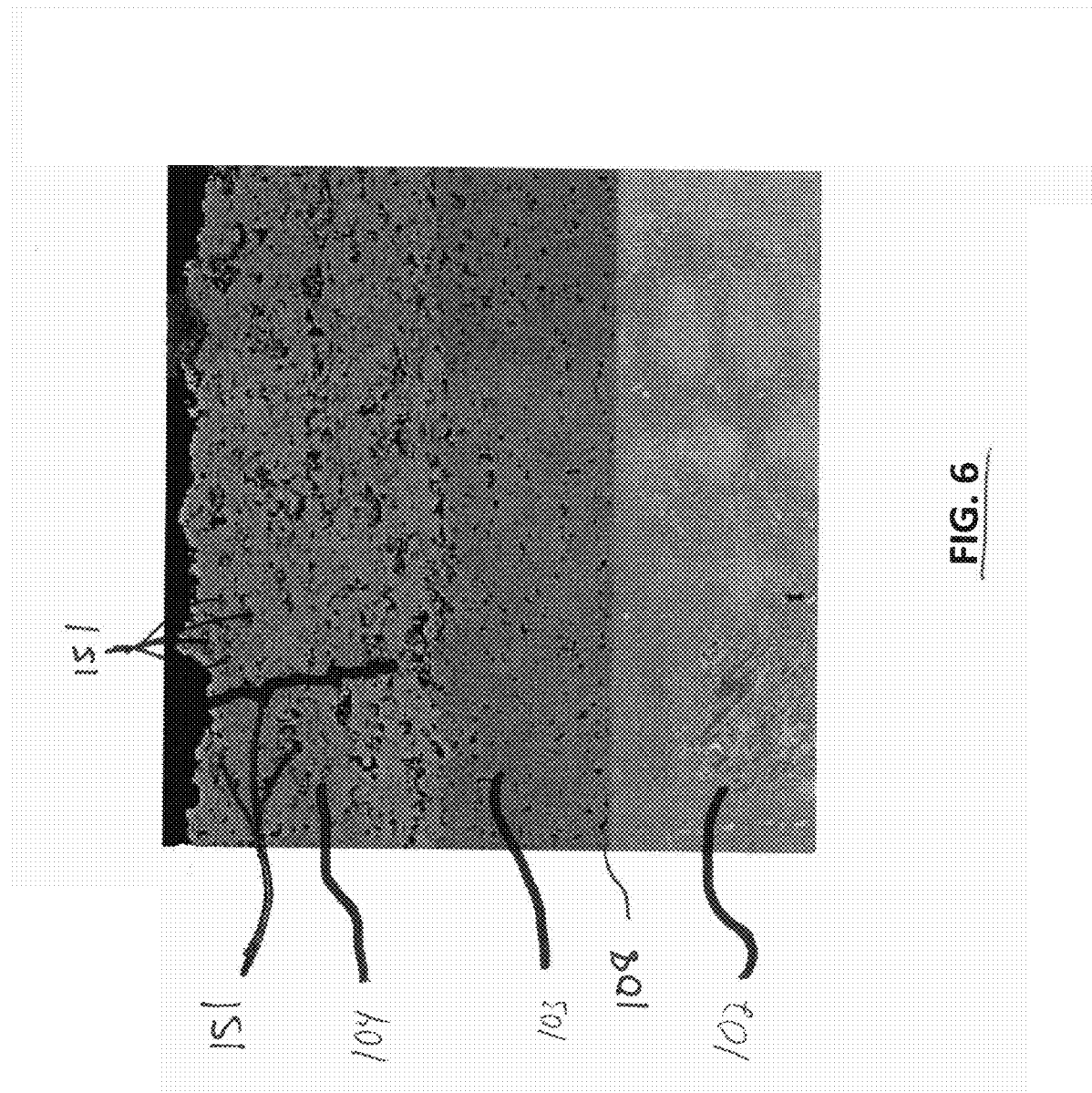
FIG. 6 is an enlarged cross-sectional image of an embodiment of the portion of the gas path component of FIG. 5.
Figure 7B:
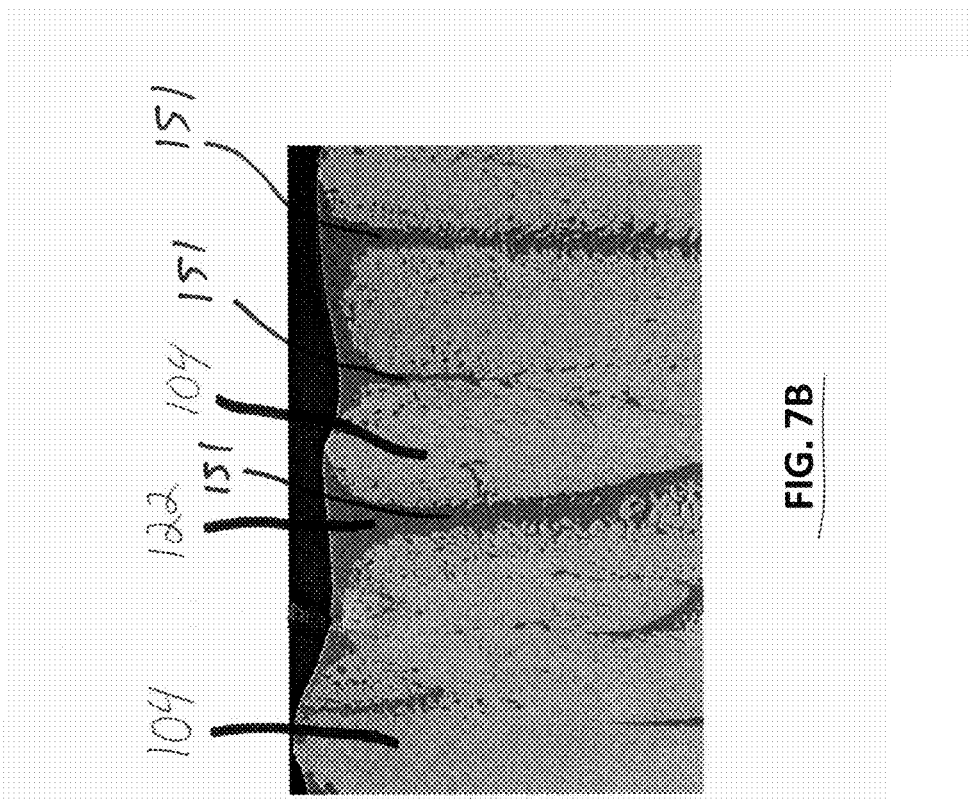
FIGS. 7A and 7B are cross-sectional images of another embodiment of the portion of the gas path component of FIG. 5.

FIGS. 6-7B illustrate cross-sectional images of the gas path component of FIG. 5 with exemplary coatings 104 (e.g., exemplary TBCs) formed over a substrate 102 and including bondcoat 103. As shown in FIGS. 6-7B, the coating 104 may include discontinuities or voids 151 into which the CMAS partial melt 122 may has flow into or otherwise infiltrate the coating 104. As described above, the porosity of the coatings 104 may play a role in providing compliance to accommodate any thermal strain mismatch between the coatings 104 and the underlying component substrate 102. As shown in FIGS. 6-7B, the discontinuities 151 may be natural or structural discontinuities 151 that naturally result from the formation of the coating 104 on substrate 102, or may be unnatural or formed after the coating 104 is formed on the substrate 102 (e.g., during use of the turbine). In this way the discontinuities 151 may result from the natural morphology or microstructure of the coating 104, or may be an unnatural gaps formed during use of the component 120.

For example, FIG. 6 illustrates a ceramic TBC 104 coating applied via an air plasma spray (APS) method. As shown in FIG. 6, the morphology of the APS-applied coating 104 may possess a pancake-like microstructure that includes a plurality of fine natural discontinuities or cracks 151 randomly distributed through the thickness of the coating 104. Such natural discontinuities 151 may be interconnected or intertwined and present at the outer surface 108 such that they provide a natural pathway for the CMAS partial melt (formed over the outer surface 108) (not shown) to flow into and thereby infiltrate the coating 104. The strain tolerance of the APS-applied coating 104 may be facilitated by the heavily intertwined network of the natural fine cracks or discontinuities 151. The network of discontinuities 151 may separate the coating 104 into segmented flakes which provide tolerance upon strain application through the temperature gradient or difference in thermal expansion with the substrate 102 but allow CMAS infiltration into the coating 104. As also shown in FIG. 6, at least one relatively large crack or other gap may be formed in the coating 104 after it is formed on the substrate 102 (e.g., during use of the component) which may also allow for the CMAS partial melt 122 (not shown) to flow into and infiltrate the coating 104 (not shown).

Figure 7A:
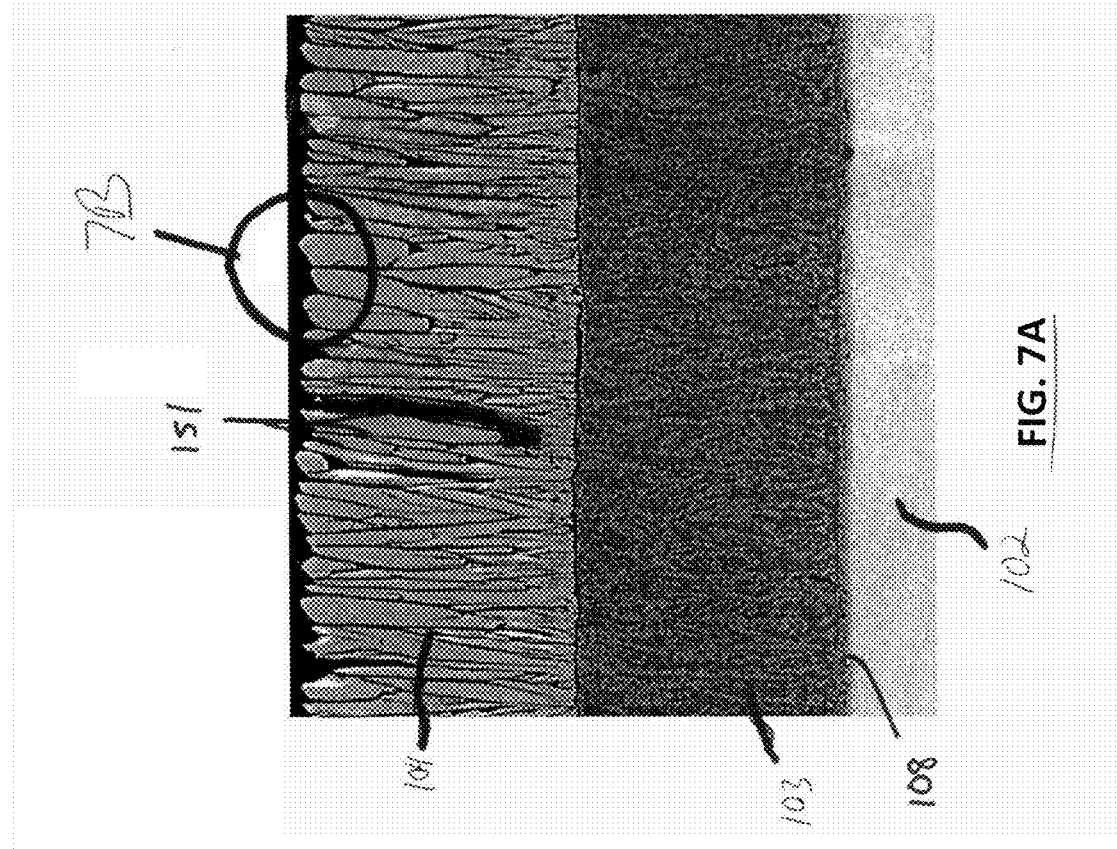

As another example, FIGS. 7A and 7B illustrate a ceramic TBC 104 coating applied via an electron beam or physical vapor deposition (EB/PVD) method. As shown in FIGS. 7A and 7B, the morphology of the EB/PVD-applied coating 104 may possess a columnar microstructure of scales. The columnar microstructure may be formed by epitaxially growing crystals of the columns or scales substantially perpendicular to the outer surface 108 of the substrate 102. The columns grow from the substrate 102 (or a bondcoat 103 formed thereon) such that they are separated from each other by small gaps or discontinuities 151, as shown in FIGS. 7A and 7B. The column structures thereby provide exceptional tolerance to deleterious tensile strains parallel to the outer surface 108. However, as shown in FIG. 7B, the small gaps or discontinuities 151 between the column structures also provide a pathway for the CMAS partial melt 122 to flow into and thereby infiltrate the coating 104. As also shown in FIG. 7A, at least one relatively large crack or other gap may be formed in the coating 104 after it is formed on the substrate 102 (e.g., during use of the component) which may also allow for the CMAS partial melt 122 to flow into and infiltrate the coating 104 (not shown).

Figure 8:
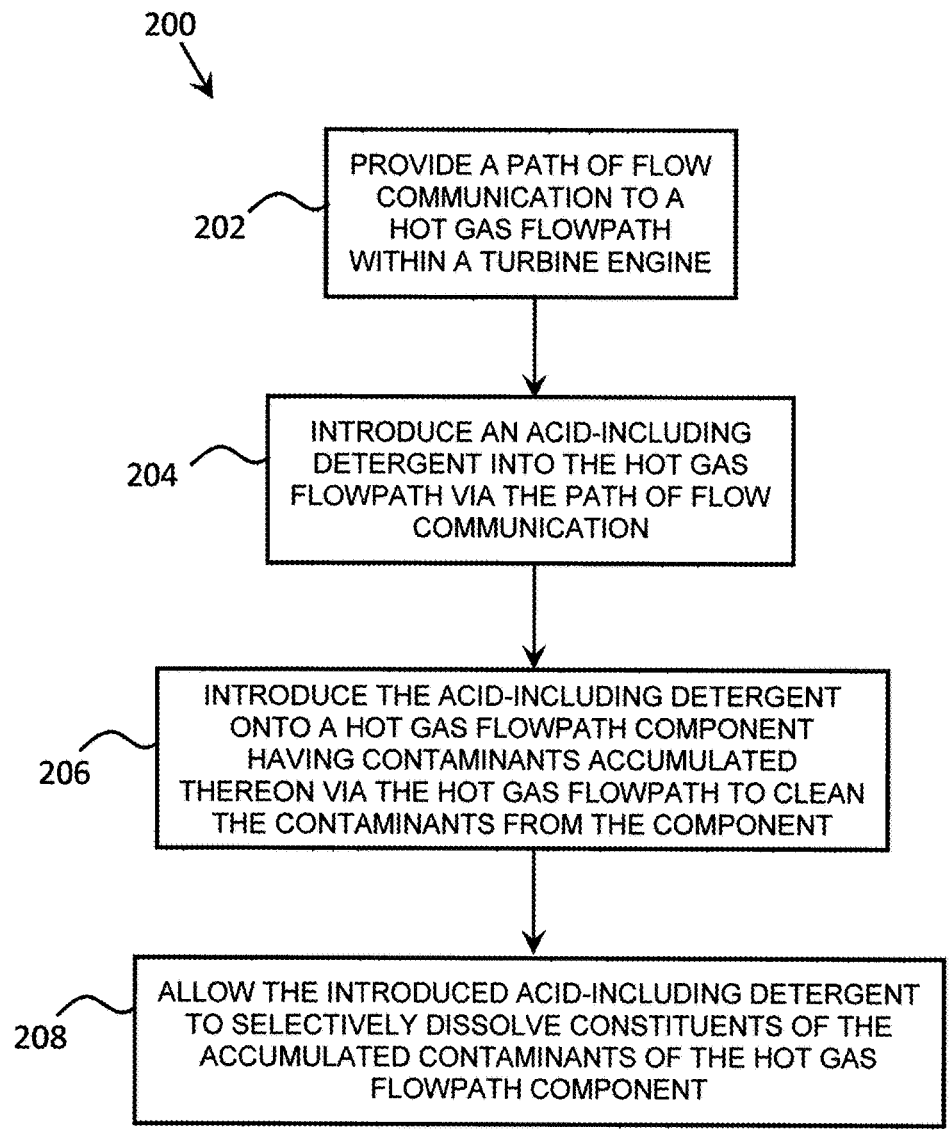
FIG. 8 is a flow chart illustrating an exemplary method of cleaning environmental contaminants accumulated on a hot gas flowpath component of a turbine engine system according to the present disclosure.

The cleaning methods and systems of cleaning a hot gas flowpath component of a turbine engine of the present disclosure may be utilized to remove accumulated (and reacted) environmental contaminants 122 from turbine component 130. As shown in FIG. 8, in some embodiments the methods and systems 200 may be configured to provide 202 a path of flow communication from exterior of the turbine engine to the hot gas pathway within the turbine engine. For example, at least one direct flow path to the hot gas flowpath may be established or formed. As another example, at least one indirect flow path to the hot gas flowpath may be established or formed, such as to a fluid passageway that is in communication with the hot gas flowpath. The path of flow communication may be established through openings in an outer wall of the turbine engine to facilitate in-situ treatment of the turbine component(s). For example, the openings may be preexisting ports utilized for other purposes other than hot gas flowpath cleaning, such as borescope apertures, burner or ignitor apertures, pressure sensor ports and taps, and/or fuel nozzle apertures, or any other existing ports, for example. As another example, the openings may be ports or inlets that are specifically formed and utilized for hot gas flowpath cleaning that are in communication with, or otherwise provide access to, the hot gas flowpath of the engine. The turbine engine may at least be partially assembled (e.g., fully assembled) and, potentially, coupled to an aircraft. In other embodiments, the component may be at least partially removed from the turbine engine before introducing the detergent thereon.

As shown in FIG. 8, in some embodiments the methods and systems 200 may be further configured to introduce 204 an acid-including detergent into a hot gas flowpath of an at least partially assembled turbine engine via the path of flow communication. In some embodiments, the detergent may be a liquid detergent, a foamed liquid detergent, or an atomized detergent. In some embodiments, the acid-including detergent may introduced 204 into a hot gas flowpath such that the detergent is passed through at least a portion of the hot gas flowpath of the at least partially assembled turbine engine in a direction that hot gases pass through the hot gas flowpath during operation of the turbine engine. In some other embodiments, the acid-including detergent may introduced 204 such that the detergent is passed through at least a portion of the hot gas flowpath of the at least partially assembled turbine engine in a direction opposing a direction that hot gases pass through the hot gas flowpath during operation of the turbine engine. In some embodiments, the acid-including detergent may introduced 204 into the hot gas flowpath at a temperature within 20 degrees C. to about 95 degrees C. for at least 15 minutes.

As shown in FIG. 8, in some embodiments the methods and systems 200 may also be configured to introduce 206 the acid-including detergent onto a hot gas flowpath component forming a portion of the hot gas flowpath via the hot gas flowpath having a layer of accumulated contaminants thereon to clean the accumulated contaminants from the component. In some embodiments, the accumulated contaminants may include CaO—MgO—Al2O3-SiO2 (CMAS) partial melt. In some embodiments, the accumulated contaminants may include sulfate and silicate partial melt. In some embodiments, the accumulated contaminants may include at least one of Na—Mg—Ca sulfate partial melt, an aluminosilicate clay or CMAS partial melt. In some embodiments, the detergent may be configured to dissolve the accumulated contaminants. As discussed above, the hot gas flowpath component may be any component of the turbine engine system that forms or interacts with a portion of the hot gas flowpath of the engine. For example, the component may be a turbine combustor component, a turbine stationary component, or a turbine rotating component. In some embodiments, the acid-including detergent may introduced 206 onto the hot gas flowpath component at a temperature within 20 degrees C. to about 95 degrees C. for at least 15 minutes. In some embodiments, the methods and systems 200 may include rotating the turbine system (or the hot gas flowpath components thereof) after the detergent is introduced 204 into the hot gas flowpath and/or introduced 206 onto the contaminated components.

In some embodiments, the hot gas flowpath component includes a thermal battier coating (TBC), and accumulated contaminants overlies the TBC. In some embodiments, the hot gas flowpath component includes a TBC, and the layer of accumulated contaminants is at least partially infiltrated into the TBC. In some embodiments, the hot gas flowpath component includes a plurality of cooling holes extending through the component. In some embodiments, the accumulated contaminants extend at least partially over or within the cooling holes, and introducing the detergent into the hot gas flowpath and onto the hot gas flowpath component removes the accumulated contaminants from over or within the cooling holes.

As shown in FIG. 8, in some embodiments the methods and systems 200 may also be configured to allow 208 the introduced acid-including detergent to selectively dissolve constituents of the accumulated contaminates of the hot gas pathway component. For example, the introduced acid-including detergent may be allowed 208 to selectively dissolve Na—Mg—Ca sulfate, aluminosilicate clays and CMAS partial melt of the accumulated contaminates on the hot gas pathway component.

In some embodiments, the methods and systems 200 may include performing cycles of cleaning processes directed towards the component to facilitate removing accumulated contaminates from the component. For example, steam or other materials may be utilized (in a substantially similar manner as the detergent) before and/or after the introduction 204/206 of the acid-including detergent. As another example, in some embodiments the methods and systems 200 may include a rinsing process within the hot gas flowpath of the turbine system. For example, after (or as) the acid-including detergent dissolves the accumulated contaminates from the hot gas flowpath components of the turbine system, a rinsing agent (e.g., water) may be routed through the hot gas flowpath to rinse the detergent and the contaminants from the hot gas flowpath. The rinsing agent may be routed to the hot gas flowpath via a nozzle, hose, or other component. For example the rinsing agent may be routed to the hot gas flowpath in a substantially similar way as the detergent was introduced 204 into the hot gas flowpath.

It is to be understood that the above description is intended to be illustrative, and not restrictive. Numerous changes and modifications may be made herein by one of ordinary skill in the art without departing from the general spirit and scope of the inventions as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the inventions have been described in detail in connection with only a limited number of embodiments, it should be readily understood that the inventions are not limited to such disclosed embodiments. Rather, the inventions can be modified to incorporate any number of variations, alterations, substitutions or equivalent arrangements not heretofore described, but which are commensurate with the spirit and scope of the inventions. Additionally, while various embodiments of the inventions have been described, it is to be understood that aspects of the disclosure may include only some of the described embodiments. Accordingly, the inventions are not to be seen as limited by the foregoing description, but are only limited by the scope of the appended claims.

This written description uses examples to disclose the inventions, including the best mode, and also to enable any person skilled in the art to practice the inventions, including making and using any devices or systems and performing any incorporated methods. The patentable scope of the inventions are defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of cleaning a hot gas flowpath component of a turbine engine, the method comprising:
    cleaning a hot gas flowpath component by introducing an acid-including detergent with a pH range of between 2 and 7 into a hot gas flowpath of an at least partially assembled turbine engine and onto at least one hot gas flowpath component forming at least a portion of the hot gas flowpath having a layer of accumulated contaminants thereon to clean the accumulated contaminants from the at least one component;

wherein the detergent comprises a first organic acidic component including citric acid within a range between about 0.1 percent and about 15 percent by volume of the detergent and at least one of isoropylamine sulphonate within a range between about 0.07 percent and 0.14 percent by volume of the detergent, alcohol ethoxylate within a range between about 0.035 percent and 0.07 percent by volume of the detergent, triethanol amine within a range between about 0.035 percent and 0.07 percent by volume of the detergent, or lauriminodipropionate within a range between about 0.03 percent and 1.0 percent by volume of the detergent.

2. The method of claim 1, wherein the accumulated contaminants comprises CaO—MgO—Al2O3-SiO2 (CMAS) partial melt.

3. The method of claim 1, wherein the hot gas flowpath component includes an environmental barrier coating (EBC), and wherein the layer of accumulated contaminants overlies the EBC.

4. The method of claim 1, wherein the accumulated contaminants comprises sulfate and silicate partial melt.

5. The method of claim 1, wherein the accumulated contaminants comprises at least one of Na—Mg—Ca sulfate partial melt, an aluminosilicate clay or CMAS partial melt.

6. The method of claim 1, wherein the at least one hot gas flowpath component comprises at least one of a turbine combustor component, a turbine stationary component or a turbine rotating component.

7. The method of claim 1, wherein the hot gas flowpath component includes a plurality of cooling holes extending through the component.

8. The method of claim 1, wherein the acid-including detergent is a foamed liquid detergent.

9. The method of claim 1, wherein the acid-including detergent dissolves the accumulated contaminants.

10. The method of claim 1, wherein the acid-including detergent is introduced into the hot gas flowpath and onto the hot gas flowpath component at a temperature within 20 degrees C. to about 95 degrees C. for at least 15 minutes.

11. The method of claim 1, wherein the at least partially assembled turbine engine is attached to an aircraft.

12. The method of claim 1, wherein the acid-including detergent is introduced into the hot gas flowpath of the at least partially assembled turbine engine via an existing port of the turbine engine.

13. The method of claim 1, further comprising forming a port in the turbine engine in communication with the hot gas flowpath, and wherein the acid-including detergent is introduced into the hot gas flowpath of the at least partially assembled turbine engine via the formed port.

14. The method of claim 1, further comprising passing the acid-including detergent through at least a portion of the hot gas flowpath of the at least partially assembled turbine engine in a direction that hot gases pass through the hot gas flowpath during operation of the turbine engine.

15. The method of claim 1, further comprising passing the acid-including detergent through at least a portion of the hot gas flowpath of the at least partially assembled turbine engine in a direction opposing a direction that hot gases pass through the hot gas flowpath during operation of the turbine engine.

16. The method of claim 1, wherein the detergent comprises a second organic acidic component including glycolic acid within a range between about 0.1 percent and about 15 percent by volume of the detergent.

17. The method of claim 1, wherein the detergent comprises water which is about 99.63 percent by volume of the detergent.

18. The method of claim 1, wherein the detergent includes at least one of less than about 10 parts per million of sodium, less than about 10 parts per million of potassium, less than about 10 parts per million of phosphorous, or combinations thereof.

19. The method of claim 1, wherein the detergent comprises less than about 2 parts per million of metals.

20. The method of claim 2, wherein the at least one hot gas flowpath component includes a thermal barrier coating (TBC), and wherein the layer of accumulated contaminants overlies the TBC.

21. The method of claim 7, wherein the accumulated contaminants block at least a portion of at least one cooling hole, and wherein the introducing the acid-including detergent into the hot gas flowpath and onto the hot gas flowpath component removes the accumulated contaminants from the at least one cooling hole.

22. The method of claim 20, wherein the layer of accumulated contaminants is at least partially infiltrated into the TBC.

* * * * *